(12) United States Patent
Kirshenbaum et al.

(10) Patent No.: US 9,792,359 B2
(45) Date of Patent: Oct. 17, 2017

(54) PROVIDING TRAINING INFORMATION FOR TRAINING A CATEGORIZER

(75) Inventors: Evan R. Kirshenbaum, Mountain View, CA (US); Henri J. Suermondt, Sunnyvale, CA (US); George H. Forman, Port Orchard, WA (US); Stephane Chiocchetti, Antony (FR)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 3700 days.

(21) Appl. No.: 11/118,178

(22) Filed: Apr. 29, 2005

(65) Prior Publication Data

US 2006/0248054 A1 Nov. 2, 2006

(51) Int. Cl.
*G06F 17/00* (2006.01)
*G06F 17/30* (2006.01)

(52) U.S. Cl.
CPC .............. *G06F 17/30705* (2013.01)

(58) Field of Classification Search
CPC ................................................ G06F 17/30705
USPC .......................................................... 707/3
See application file for complete search history.

(56) References Cited

U.S. PATENT DOCUMENTS

| | | | |
|---|---|---|---|
| 5,805,730 A * | 9/1998 | Yaeger et al. ............... 382/228 |
| 5,819,258 A | 10/1998 | Vaithyanathan et al. |
| 5,872,865 A | 2/1999 | Normile et al. |
| 5,903,884 A * | 5/1999 | Lyon et al. .................. 706/25 |
| 5,943,670 A | 8/1999 | Prager |
| 6,003,027 A * | 12/1999 | Prager ........................... 707/5 |
| 6,006,222 A * | 12/1999 | Culliss |
| 6,038,560 A | 3/2000 | Wical |
| 6,161,130 A | 12/2000 | Horvitz |
| 6,182,066 B1 | 1/2001 | Marques |
| 6,192,360 B1 * | 2/2001 | Dumais et al. |
| 6,253,169 B1 | 6/2001 | Apte |
| 6,343,275 B1 * | 1/2002 | Wong ........................ 705/26.1 |
| 6,418,434 B1 * | 7/2002 | Johnson et al. |
| 6,446,061 B1 | 9/2002 | Doerre |
| 6,675,161 B1 * | 1/2004 | Suchter ......................... 707/5 |
| 6,701,333 B2 | 3/2004 | Suermondt et al. |
| 6,704,905 B2 | 3/2004 | Fukushige et al. |
| 6,727,914 B1 * | 4/2004 | Gutta ........................... 715/719 |
| 6,728,690 B1 | 4/2004 | Meek et al. |

(Continued)

FOREIGN PATENT DOCUMENTS

EP 0747846 A 12/1996

OTHER PUBLICATIONS

Kirshenbaum et al., U.S. Appl. No. 11/172,187, entitled "Effecting Action to Address an Issue Associated with a Category Based on Information that Enables Ranking of Categories," filed Jun. 30, 2005, pp. 1-52, Figs. 1-5H.

(Continued)

*Primary Examiner* — Tarek Chbouki

(57) ABSTRACT

A method and system of providing training information for training a categorizer includes receiving a query relating to at least one category and identifying at least one case within a data set that matches the query. The method and system receives one of a first indication that the identified at least one case belongs to the category, and a second indication that the identified at least one case does not belong to the category. Training information is modified based on receiving one of the first indication and second indication.

44 Claims, 5 Drawing Sheets

(56) References Cited

U.S. PATENT DOCUMENTS

| | | | |
|---|---|---|---|
| 6,751,600 B1* | 6/2004 | Wolin | 706/12 |
| 6,778,704 B1 | 8/2004 | Kawatani | |
| 6,823,323 B2 | 11/2004 | Forman et al. | |
| 6,839,680 B1 | 1/2005 | Liu | |
| 6,842,751 B1 | 1/2005 | Vilalta et al. | |
| 6,944,616 B2 | 9/2005 | Ferguson et al. | |
| 6,973,452 B2 | 12/2005 | Metzger et al. | |
| 7,043,492 B1 | 5/2006 | Neal et al. | |
| 7,113,957 B1* | 9/2006 | Cohen et al. | 707/102 |
| 7,133,834 B1 | 11/2006 | Abelow | |
| 7,177,855 B2* | 2/2007 | Witkowski et al. | 707/2 |
| 7,184,602 B2* | 2/2007 | Cohen et al. | 382/243 |
| 7,200,606 B2 | 4/2007 | Elkan | |
| 7,263,530 B2 | 8/2007 | Hu | |
| 7,325,005 B2 | 1/2008 | Forman et al. | |
| 7,415,136 B2* | 8/2008 | Gallagher et al. | 382/110 |
| 7,437,338 B1 | 10/2008 | Forman | |
| 7,472,095 B2 | 12/2008 | Huelsbergen | |
| 7,593,904 B1 | 9/2009 | Kirshenbaum | |
| 7,668,789 B1 | 2/2010 | Forman | |
| 8,719,073 B1 | 5/2014 | Kirshenbaum | |
| 2002/0016798 A1 | 2/2002 | Sakai | |
| 2002/0107712 A1 | 8/2002 | Lam et al. | |
| 2002/0169770 A1 | 11/2002 | Kim | |
| 2002/0184524 A1 | 12/2002 | Steele | |
| 2003/0046098 A1 | 3/2003 | Kim | |
| 2003/0088639 A1* | 5/2003 | Lentini et al. | 709/217 |
| 2003/0187809 A1 | 10/2003 | Suermondt et al. | |
| 2004/0064464 A1 | 4/2004 | Forman et al. | |
| 2004/0139059 A1 | 7/2004 | Conroy | |
| 2005/0015273 A1 | 1/2005 | Iyer | |
| 2005/0060643 A1* | 3/2005 | Glass et al. | 715/501.1 |
| 2005/0096866 A1 | 5/2005 | Shan et al. | |
| 2005/0114229 A1* | 5/2005 | Ackley et al. | 705/26 |
| 2005/0126505 A1* | 6/2005 | Gallager et al. | 119/234 |
| 2005/0240572 A1* | 10/2005 | Sung et al. | 707/3 |
| 2006/0089924 A1 | 4/2006 | Raskutti | |
| 2006/0111928 A1* | 5/2006 | Fisher et al. | 705/1 |
| 2006/0116994 A1* | 6/2006 | Jonker et al. | 707/3 |
| 2006/0143254 A1* | 6/2006 | Chen et al. | 707/205 |
| 2006/0161423 A1* | 7/2006 | Scott et al. | 704/10 |
| 2006/0173559 A1 | 8/2006 | Kirshenbaum et al. | |
| 2006/0200341 A1* | 9/2006 | Corston-Oliver et al. | 704/5 |
| 2006/0248054 A1 | 11/2006 | Kirshenbaum et al. | |
| 2007/0156677 A1* | 7/2007 | Szabo | 707/5 |
| 2007/0185901 A1 | 8/2007 | Gates | |
| 2008/0046273 A1* | 2/2008 | Tenorio | 705/1 |
| 2008/0097822 A1 | 4/2008 | Schigel | |

OTHER PUBLICATIONS

Kirshenbaum et al., U.S. Appl. No. 11/211,979, entitled "Producing a Measure Regarding Cases Associated with an Issue After One or More Events Have Occurred," filed Aug. 25, 2005, pp. 1-51, Figs. 1-5H.

Forman et al., U.S. Appl. No. 11/364,108, entitled "Identifying an Emerging or New Category," filed Feb. 28, 2006, pp. 1-34, Figs. 1-6.

Forman et al., U.S. Appl. No. 11/393,487, entitled "Comparing Distributions of Cases Over Groups of Categories," filed Mar. 30, 2006, pp. 1-39, Figs. 1-7E.

Office Action dated Sep. 18, 2007 in U.S. Appl. No. 11/118,786.

Office Action dated Jan. 17, 2008 in U.S. Appl. No. 11/386,005.

Shan, U.S. Appl. No. 11/119,037, entitled "Detecting Change in Data," filed Apr. 29, 2005, pp. 1-26, Figs. 1-6.

Shan, U.S. Appl. No. 11/117,989, entitled "Performing Quality Determination of Data," filed Apr. 29, 2005, pp. 1-32, Figs. 1-9.

Forman et al., U.S. Appl. No. 11/386,005, entitled "Providing Information Regarding a Trend Based on Output of a Categorizer," filed Mar. 21, 2006, pp. 1-44, Fig. 1-5G.

Shan, U.S. Appl. No. 11/118,832, entitled "Determining a Time Point Corresponding to a Change in Data Values Based on Fitting with Respect to Plural Aggregate Value Sets," filed Apr. 29, 2005, pp. 1-26, Figs. 1-8.

E.R. Kirshenbaum et al., U.S. Appl. No. 11/118,786, entitled "Computing a Quantification Measure Associated with Cases in a Category," filed Apr. 29, 2005, pp. 1-35, Figs. 1-3D.

Charles H Heenan: "Manual and Technology-Based approaches to using classification for the facilitation of access to unstructured test" engineering informatics group department of civil and environmental engineering; Stanford University, Jan. 2, 2002, xpoo2395544; p. 36, fig 20, p. 72, paragraphs overall, review.

Quin Shun et al : "Integration of Manual and Automatic Text Categorization. A Categorization workbench for text-based email and spam". KI 2004: Advances in artificial intelleigence, vol. 3238/2004, Jan. 6, 2005; pp. 156-167, XPOO2395556.

Final Rejection dated Apr. 18, 2008 in U.S. Appl. No. 11/118,786.

U.S. Appl. No. 11/118,786, Non-Final Rejection dated Feb. 25, 2013, pp. 1-23 and attachment.

U.S. Appl. No. 11/118,786, Non-Final Rejection dated Jul. 20, 2012, pp. 1-25 and attachments.

U.S. Appl. No. 11/118,786, Examiner's Answer dated Dec. 8, 2008 (22 pages).

U.S. Appl. No. 11/118,786, Decision on Appeal dated Nov. 30, 2011 (15 pages).

Fall et al., Computer-Assisted Categorization of Patent Documents in the International Patent Classification, Proceedings of the International Chemical Information Conference, Nimes, Oct. 2003 (14 pages).

Li, Y.H et al, "Classification of Text Documents," Department of Computer Science and Engineering, Michigan State University, E. Lansing, Michigan, The Computer Journal, vol. 41, No. 8, 1998 (10 pages).

Office Actions of File History of U.S. Appl. No. 11/211,979, dated Sep. 6, 2013, Apr. 27, 2011, Sep. 10, 2010, Mar. 19, 2010, and Aug. 28, 2009 (116 pages).

Office Actions of File History of U.S. Appl. No. 11/364,108, dated Oct. 1, 2012, Dec. 22, 2011, Jul. 22, 2011, Oct. 22, 2010, and Apr. 14, 2010 (167 pages).

Pottenger et al., Detecting Emerging Concepts in Textual Data Mining, Department of Electrical Engineering and Computer Science, Lehigh University, Bethlehem, PA 18015, Apr. 2001 (17 pages).

Ramana Rao, From Unstructured Data to Actionable Intelligence, IEEE Computer Society, Nov. 2003 (7 pages).

Takkinen, Juha, et al "CAFE: A Conceptual Model for Managing Information in Electronic Mail," Laboratory for Intelligent Information Systems, Department of Computer and Information Science, Linkoping University, Sweden, Conference on System Sciences, 1998 (10 pages).

U.S. Appl. No. 11/118,786, Non-Final Rejection dated Sep. 4, 2013, pp. 1-23 and attachments.

Xiaogang Peng, Sense-Based Text Classification by Semantic Hierarchy Representation—Nov. 2004 (92 pages).

U.S. Appl. No. 11/118,786, Final Rejection dated Apr. 10, 2014, pp. 1-30 and attachments.

U.S. Appl. No. 11/118,786, Notice of Allowance dated Jan. 22, 2015, pp. 1-14 and attachments.

Forman et al., U.S. Appl. No. 11/080,098, entitled "A Method of, and System for, Classification Count Adjustment," filed Mar. 14, 2005, pp. 1-31, Figs. 1A-5.

\* cited by examiner

PROVIDING TRAINING INFORMATION FOR TRAINING A CATEGORIZER

BACKGROUND

Categorizers are often used in data mining applications, where data contained in a database (or multiple databases) is analyzed and used for various purposes (such as to determine customer purchasing habits and preferences or for other purposes). A categorizer looks at a data item (e.g., article, product, customer, stock, support call, and so forth), and decides, based on information associated with the item (e.g., text, cost, date, duration, buying history, trade volume, and so forth), whether the item should be associated with a particular category or multiple categories. The categorizer decides which of a set of potential categories most likely applies, describes, or should be associated with the data item in question. A "category" refers to a label, annotation, or some other form of identifying indicator.

A categorizer has to be trained to enable the categorizer to perform categorization tasks. Various conventional algorithms exist to train categorizers. The categorizer implemented according to a given algorithm is associated with a set of parameters that the categorizer uses to make its decision. Often, the parameters are in the form of weights attached to the presence or absence of various features (words, purchases, and so forth). The parameters can be set manually (e.g., by an expert creating categorization rules) or deduced automatically from data. Most conventional techniques for training categorizers rely on the notion of a labeled training set, which is a set of training cases each annotated with a category (or multiple categories). The annotated category, or categories, constitutes the "correct answer" for each training case. The correctness of the categorizer is judged based on the errors the categorizer makes with respect to the categorizations of cases in the training set. Often the correctness will be judged based on the errors the categorizer makes with respect to a subset of the cases in the training set, the subset (called a "validation set") not being used otherwise in training the categorizer.

With many conventional approaches, training a categorizer involves two separate stages. In a first stage, a training set is acquired. Then, the training set is used to train the categorizer. To acquire a training set, several approaches are used. A first approach involves acquiring training sets where the "correct answer" can be ascertained at some point after a prediction is made. However, this training approach may not be useful for circumstances where the correct answer cannot be objectively ascertained at some later point in time.

A second approach to acquire a training set involves obtaining desired information about a subset of observed cases by asking people to divulge information about themselves, such as purchasing information or other information. In one example, people can be asked to complete surveys. Alternatively, the information can be purchased from a third party or some other data source, or by physically measuring an object or plural objects. This second approach is usually expensive in terms of time and effort. Additionally, if surveys or other techniques of acquiring information are not designed properly, the training set acquired may not provide the desired level of accuracy in training categorizers.

In an approach used in the customer service call center context for acquiring a training set, customer support representatives are asked to choose categorizations (also referred to as issue paths) from a set of possibilities at the time that a customer call occurs. However, many customer support representatives may not be properly trained to recognize all possible answers, so that the categorization performed by such customer support representatives may not be accurate. Also, it may be expensive to train people to properly recognize all possible categorizations. Additionally, customer support representatives may not be properly motivated to spend the time to provide accurate categorizations, since the performance of customer support representatives may be measured on how quickly they resolve calls, not on how accurately they categorize the calls. Also, the set of possibilities may not include a category that accurately describes the customer call.

Another approach for acquiring a training set involves asking an expert to provide a correct answer for a randomly drawn subset of cases. The expert usually has to be prepared to distinguish among all possible categories (dozens or even hundreds of possible categories) to find the correct answer for each particular case. Also, an expert may not be qualified to recognize cases for certain categories. In addition, an expert may have to look at a large number of cases to accurately find a sufficient number of examples for certain types of categories. This training approach can be relatively expensive and may not produce sufficiently accurate results for training categorizers.

BRIEF DESCRIPTION OF THE DRAWINGS

Some embodiments of the invention are described with respect to the following figures.

DETAILED DESCRIPTION

Figure 1:
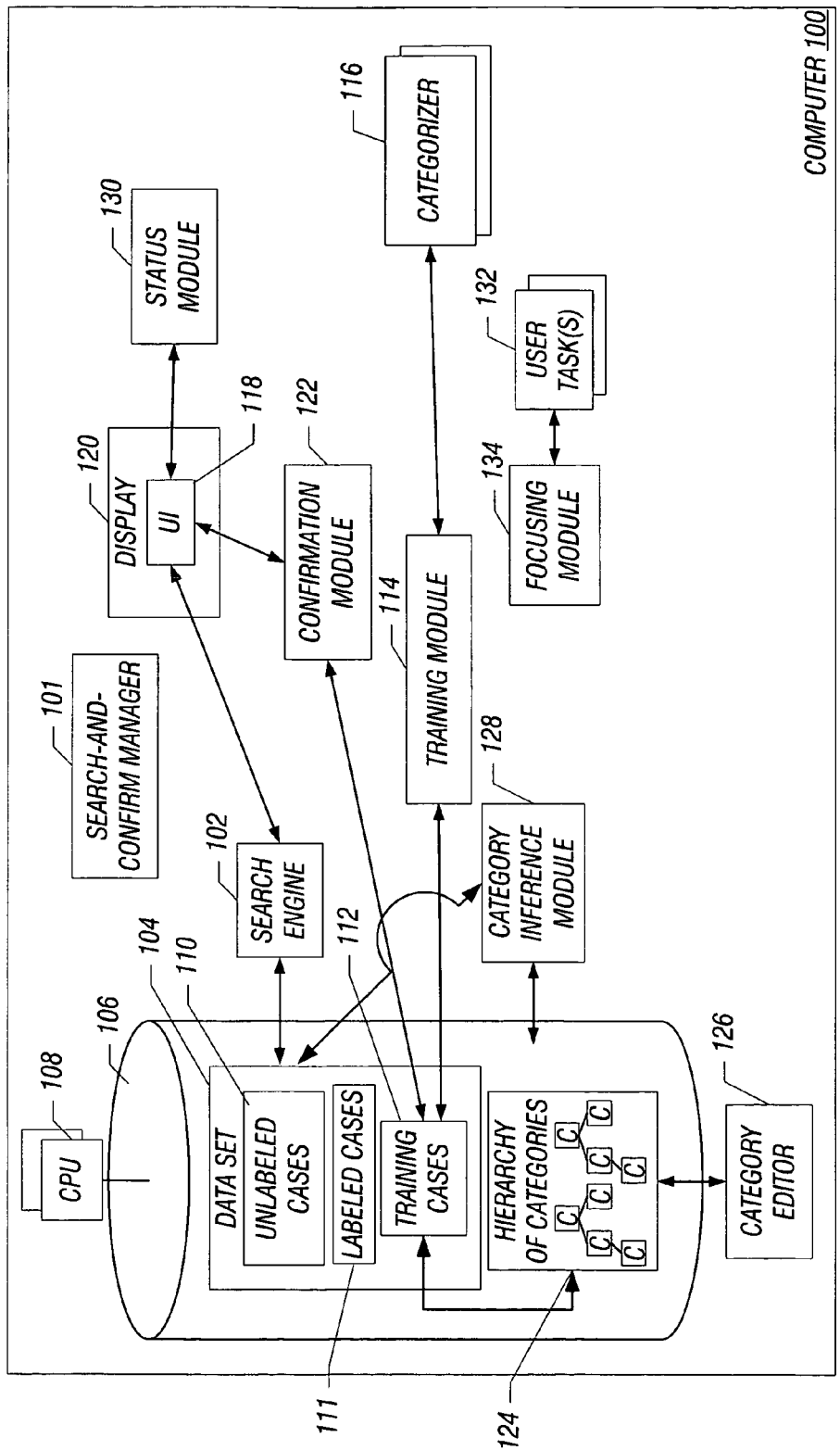
FIG. 1 is a block diagram of an example system that incorporates a search-and-confirm mechanism for developing training information for training a categorizer, in accordance with an embodiment of the invention.

FIG. 1 illustrates a computer 100 in which various modules according to some embodiments of the invention are executable. The modules can be considered to be part of a tool (or multiple tools). The modules include modules that are part of a search-and-confirm mechanism for developing training information (in the form of training cases 112 according to some embodiments) to be used for training a categorizer 116 so that the categorizer will be better able to categorize cases into various categories (which are part of a hierarchy 124 of categories). Training a categorizer refers to building or modifying a categorizer based on the training cases 112. The training cases 112 include a positive training set of cases and a negative training set of cases developed for each of the categories in the hierarchy 124 using the search-and-confirm mechanism, described further below.

The search-and-confirm mechanism includes the following modules: search-and-confirm manager 101, search engine 102, confirmation module 122, and training module 114. The search engine 102 and confirmation module 122 are capable of receiving user input for developing the training cases 112 from unlabeled cases 110 and labeled cases 111 in a data set 104. Labeled cases refer to cases that have been labeled with respect to one or more categories, whereas unlabeled cases refer to cases that have not been labeled. These training cases 112 are used by the training module 114 to train the categorizer 116. A feature of some embodiments of the invention is that development of the training cases 112 by the search engine 102 and confirmation module 122 can occur generally concurrently with training of the categorizer based on the developed (or developing) training cases 112. For example, the training of the categorizer 116 can occur in the background as the user interacts with the search engine 102 and confirmation module 122 to generate training cases.

The search-and-confirm manager 101 performs overall management operations, such as managing the storing of data (including training cases 112) in a storage 106 and coordination among the various modules of the computer 100. The search engine 102 is able to receive a query from a user (such as through a user interface (UI) 118 presented in a display monitor 120) and to issue the query to identify cases from among the unlabeled cases 110 and labeled cases 111 in the data set 104. The data set 104 is stored in the storage 106, which can be persistent storage (such as magnetic or optical disk drives or non-volatile semiconductor memory devices), volatile memory (such as dynamic random access memories or static random access memories), or other types of storage devices. The storage 106 is connected to one or plural central processing units (CPUs) 108. Alternatively, the data set 104 can be remotely located, such as in a remote database system.

Using the search-and-confirm techniques according to some embodiments of the invention described further below, the search-and-confirm manager 101, search engine 102, and confirmation module 122 are operable to create the training cases 112 from the unlabeled cases 110. In response to a query received by the search engine 102, the search engine 102 displays information regarding identified cases from among the unlabeled cases 110 that match the query. A case is said to "match" a query if any information associated with the case satisfies some criterion, such as search term, in the query. The displayed information regarding the identified cases is presented in the user interface 118. The user interface 118 can be a graphical user interface, according to an example implementation.

The information displayed in the user interface 118 by the search engine 102 in response to the query includes information regarding a subset of the unlabeled cases 110 that match search criterion(ia) (in the form of search terms) in the query. A "term" specified by a query refers to any string, substring, regular expression, glob expression, non-textual object (e.g., audio object, video object, etc.), or any other type of term. A "glob expression" is an expression containing an operator indicating presence of zero or more characters (e.g., *), an arbitrary character (e.g., ?), a range of characters, or a range of strings. A case matches a search term in the query if any information associated with the case satisfies the search term in any specified manner (in other words, equality between the case information and the search term is not required, since the query can specify other forms of relationships between the case information and search term). Not all cases that match need to be used. The user interface 118 displays a summary of a selection of or all of the matching cases to provide a user with information regarding the cases. The process of specifying a query and viewing results of matching cases is referred to as a "scooping" process. Following the scooping process, a "confirming" process is performed in which a user is able to confirm whether or not each of the matching cases belongs to a particular category (by selecting or deselecting displayed fields or other indicators).

User confirmation (or disconfirmation) is monitored by the confirmation module 122. Note that not all displayed cases need to be confirmed or disconfirmed. For cases that have been correctly matched to a category, such cases are added to a positive training set of cases. On the other hand, for cases that have been incorrectly matched, the confirmation module 122 adds such incorrectly matched cases to a training set of negative cases. The negative training set and the positive training set, which are part of the training cases 112 stored in the data set 104, are accessed by the training module 114 for training the categorizer 116.

As it receives confirm and disconfirm indications, the confirmation module 122 has the ability to infer that cases belong or do not belong to multiple categories based on the hierarchical relationship (parent/child) of the categories. The ability to infer allows the confirmation module 122 to more quickly build up the positive and negative training sets. Also, the search-and-confirm mechanism according to some embodiments enables a user to focus on a single category at a time for the purpose of building up the positive and negative training sets, which simplifies the task of developing training cases.

As the user performs the scooping and confirming processes, the user may add categories (or even subcategories of existing categories) to the hierarchy 124 of categories as warranted. Note that there may already be a developed set of categories before the search-and-confirm procedure is started, which existing set of hierarchies can be used as a starting point. In an alternative scenario, such as with a new project, no categories may exist. In this alternative scenario, the user may create one or a few categories as the starting point, or the one or few categories can be created by another technique, described further below.

In one embodiment, the existing categories or created categories are stored as the hierarchy 124 of categories in the storage 106. The hierarchy of categories 124 in the storage 106 can be modified (by moving, adding or deleting categories or subcategories) in response to input by a user as the user is performing the scooping and confirming processes. In one implementation, the hierarchy 124 of categories is a directed acyclic graph (DAG) rather than a tree. In other words, any category in the hierarchy 124 can have not only several children, but also several parents. However, a category cannot be simultaneously an ancestor and a descendant of another category. Subcategories (associated with a particular category) are considered the children of the particular category. In another implementation, the hierarchy 124 of categories is a flat list of categories (hierarchy of one). In some embodiments, there may be a predefined bound on the allowed depth of the hierarchy 124 of categories, up to and including a restriction that the hierarchy 124 of categories is a flat list containing no subcategories. In alternative implementations, other structural relationships of categories can be employed.

A category editor 126 is executable in the computer 100 to edit the hierarchy of categories 124, in response to user input at the user interface 118. For example, the user may decide to add categories (or subcategories), delete categories (or subcategories), or modify categories (or subcategories). In response to user input to add, delete, or modify categories (or subcategories), the category editor 126 is able to modify the hierarchy 124 of categories.

Another optional module in the computer 100 is a category inference module 128, which is capable of examining the unlabeled cases 110 (or other cases in the data set 104 such as the labeled cases 111) stored in the data set 104 and construct an initial set of one or more categories based on the examination of the unlabeled cases 110. The category inference module 128 is thus able to create an initial set of categories that can be used to start the search-and-confirm processes.

Another module in the computer 100 is a status module 130 that is able to determine the quality of the categorizer 116 that has been built using techniques according to some embodiments of the invention. The status module 130 is able to display information pertaining to this quality measure (and/or other measures) in the user interface 118, either in textual form, graphical form, or in some other form.

Examples of information pertaining to the measure of the quality of the categorizer 116 that has been trained using training information developed according to some embodiments includes: a true positive rate (the likelihood that an item in a category will be identified by the categorizer to be in the category); a false negative rate (the likelihood that an item in a category will be identified by the categorizer to be not in the category); a true negative rate (the likelihood that an item that is not in a category will be identified by the categorizer to be not in the category); a false positive rate (the likelihood that an item that is not in a category will be identified by the categorizer to be in the category); an accuracy measure (the likelihood that an item will be correctly identified to be or not to be in a category); a recall measure (same as true positive rate); a precision measure (the likelihood that an item identified to be in a category actually is in the category); a bi-normal separation measure (a measure of the separation between the true positive rate and the false positive rate); an information gain measure (a measure of the decrease in entropy due to the categorizer); a lift measure (a measure of an increase in, e.g., response rate if only the cases the categorizer is most confident about are processed); a measure of stability under cross-validation (measure of the likelihood that the categorizer has or has not overfit the training information by learning to recognize individual cases rather than learning generalities that apply to unseen data); a measure of an area under an ROC (receiver operating characteristic) curve (area under a curve that is a plot of true positive rate versus false positive rate for different threshold values for a categorizer); a number of training cases; percentage of target training size (same as number of training cases, except with the added notion that a user has indicated a desire to see a minimum number of cases for every category); an f-measure (a parameterized combination of precision and recall); a total cost (an expected aggregate cost over analyzed cases considering separate individual costs for the true positives, true negatives, false positives, and false negatives); and an average cost (similar to total cost, except averaged over the number of cases).

Also present in the computer 100 may be user tasks 132 that are invocable by a user to perform various functions, such as creating training cases, finding example cases for a particular category, finding subcategories for a category, and identifying new categories by looking at cases that the categorizer 116 is unable to find categories for. Associated with the user tasks 132 is a focusing module 134 that monitors the execution of one or more of the user tasks 132 for the purpose of computing a score for each of the tasks 132 to determine whether or not the user or computer should switch to another task.

The search-and-confirm manager 101, the search engine 102, the confirmation module 122, training module 114, categorizer 116, category editor 126, category inference module 128, status module 130, user tasks 132, and focusing module 134 can be implemented as software executable on the CPU(s) 108. Although depicted as being separate modules, the search engine 102, confirmation module 122, training module 114, category editor 126, category inference module 128, status module 130, user tasks 132, and focusing module 134 can be combined into fewer modules or divided into a larger number of modules to perform tasks associated with the respective modules. Also, in other embodiments, some of the modules may be omitted.

Figure 2:
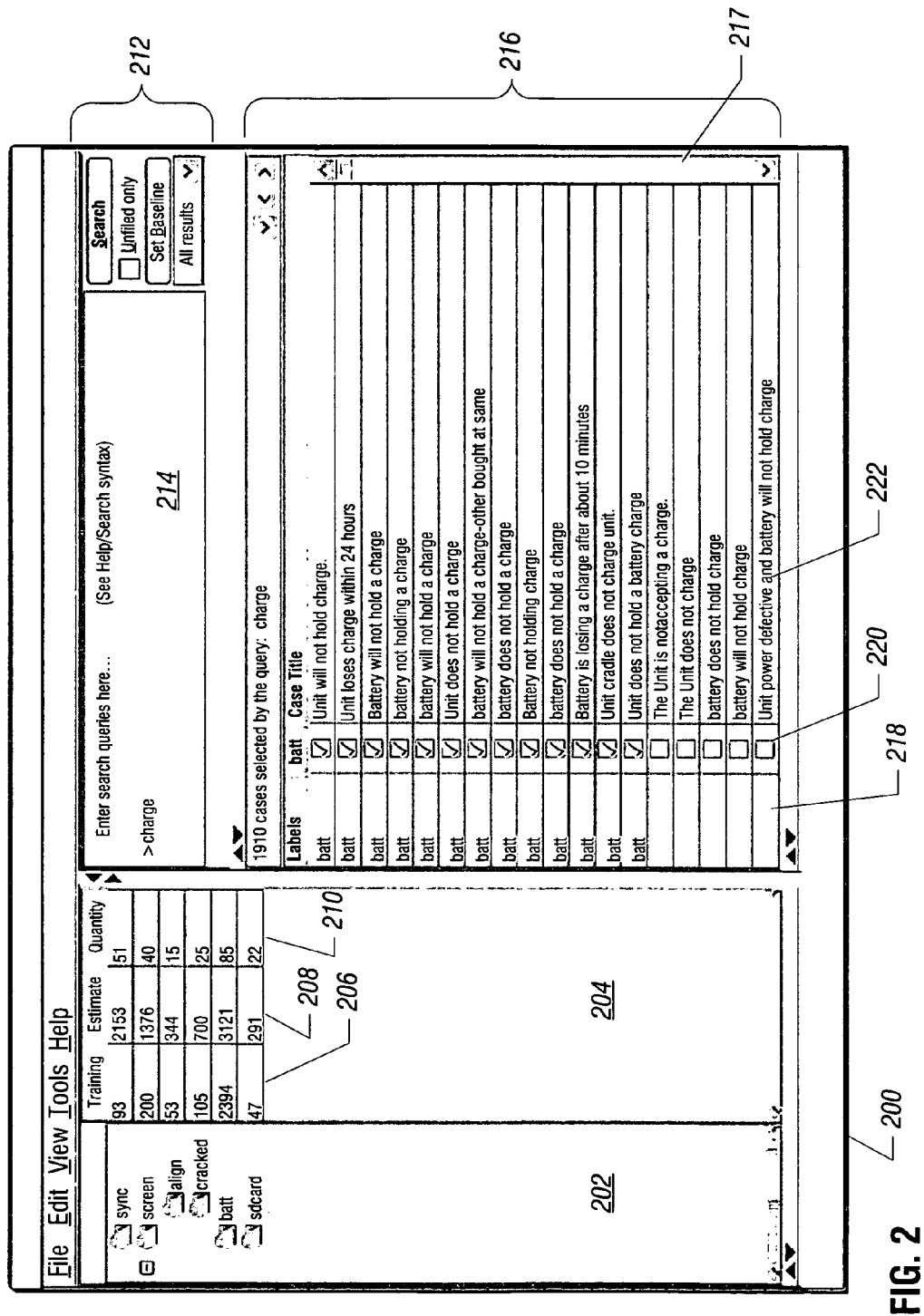
FIG. 2 illustrates a user interface for presenting information associated with the search-and-confirm mechanism, according to an embodiment.

FIG. 2 illustrates an example of a GUI screen 200 that can be displayed in the user interface 118 (FIG. 1), according to some embodiments. The content of the GUI screen 200 is provided by one or more of the search engine 102, confirmation module 122, search-and-confirm manager 101, categorizer 116, training module 14, category editor 126, and category inference module 128.

The GUI screen 200 includes a first frame 202 that displays the hierarchy of categories (also referred to as "classmap") that is being built by modules depicted in FIG. 1. In the example depicted in FIG. 2, the four main categories include "sync," "screen," "batt," and "sdcard." Note that any of these four categories can include subcategories. For example, the "screen" category has subcategories. Examples of subcategories of the "screen" category include the "cracked" subcategory, and the "align" subcategory. The subcategories can further include subcategories to any desired depth.

The GUI screen 200 also includes a second frame 204 with a "training" column 206 to display the number of cases that have been identified by a user (either directly or by inference) as being positive cases for a given category. The "Training" column 206 lists the number of cases for each of the "sync," "screen," "batt," and "sdcard" categories. For example, in the "Training" column 206, the "sync" category has 93 cases, the "screen" category has 200 cases, the "batt" category has 2394 cases, and the "sdcard" category has 47 cases.

As noted above, a way to quickly build up positive and (especially) negative training sets is by taking advantage of the hierarchical structure of the categories. The following is an example hierarchy (different from the example shown in FIG. 2):

hardware
    battery
    screen
      cracked
      bad-color
  software
    e-mail At the top level, there are two categories: "hardware" and "software." The "hardware" category has two subcategories "battery" and "screen." The "screen" category has two subcategories "cracked" and "bad-color." The "software" category has a subcategory "e-mail." As examples, if the user labels a case as belonging to a "battery" category, the confirmation module 122 will infer that the case also belongs to a "hardware" category. (For example, when added to the set of positive cases for "battery", the case will also be added to the set of positive cases for "hardware".) If a case is labeled as not belonging to a "screen" category, the confirmation module 122 will infer that the case does not belong to a "cracked" or "bad-color" category. In many situations, there may also be a presumption that most cases only belong in a single category (not counting parentage inferences), so if a case is labeled "battery" it can be inferred that the case is not in the "screen" category (and therefore not in the "cracked" or "bad-color" categories). Based on this assumption, the case labeled in the "battery" category (which is a subcategory of the "hardware" category), the confirmation module also will infer that the case does not belong to either the "software" or "e-mail" category. These inferences can, however, be rebutted. If a case already labeled as being "e-mail" (and therefore "software") is newly labeled "cracked", the case will be considered positive for "screen" and "hardware" and negative for "battery" and "bad-color", but the inference into "software" will be blocked and the case will remain "software" and "e-mail" as well as "hardware", "screen", and "cracked".

Another column in the second frame 204 is an "Estimate" column 208, which displays the estimated number of cases identified by the categorizer 116 as belonging to each of the categories and subcategories. A third "Quantity" column 210 lists an estimated sum of some user-identified piece of data, such as time spent on cases that belong in this category or cost of handling the cases in this category. Another optional column in the second frame 204 can indicate the perceived quality of the current categorizer with respect to each particular category (as determined by the status module 130 of FIG. 1). The information pertaining to perceived quality can include the accuracy of the categorizer with respect to positive and negative training cases, the perceived stability of the categorizer with respect to the category (as may be estimated by various sensitivity-analysis techniques or by methods such as cost-validation), the perceived importance of the user focusing attention on each particular category, information about the current confusability of the category with respect to an identified category, or any of the other information regarding the measure of the categorizer listed earlier. For example, with respect to the "batt" category, the information about the current confusability of the "batt" category relates to how often positive cases for the "batt" category are incorrectly identified as positives for each of the other categories and how often cases are incorrectly identified as positives for the "batt" category that are actually positive for the other categories. The information about the confusability of a category is based on the false negative rate and false positive rate measures.

A search frame 212 is also displayed in the GUI screen 200. The search frame 212 includes a search area 214 in which a user can enter a query for performing the scooping process. As part of the scooping process, the user-provided query is submitted to the search engine 102 (FIG. 1) to retrieve a number of cases that will be displayed in a display frame 216. In the example shown in FIG. 2, the query contains the search term "charge," which means "find cases that contain the word charge."

The display frame 216 displays a summary (e.g., title) of each of the cases identified by the search based on the query entered in the search frame 212. Note that each case is associated with several pieces of information, with the title being one of the pieces, for example. In other implementations, other pieces of information associated with the cases can be displayed. In some embodiments, the user may separately select which pieces of information are to be displayed, to be used for matching queries, and to be used for training the categorizer. In the example of FIG. 2, the leftmost column 218 of the display frame 216 indicates the category (in text form) of each of the corresponding cases. In a second column 220 of the display frame 216, user-selectable boxes are provided to allow a user to confirm whether or not the corresponding cases belong to the category displayed, in this case, the "batt" category. The user-selectable boxes are clickable by a user to perform confirmation or disconfirmation. Also, the categorizer 116 can provide an initial guess as to whether or not the displayed cases belong to the category (by displaying a check mark or leaving the user-selectable box blank).

If the result cases do not fit in one page, a scroll bar 217 is provided to enable the user to scroll to the remaining cases. Alternatively, a user may specify that the GUI screen 200 displays a subset of randomly or otherwise selected cases that fit within the display frame 216, such that the scroll bar 217 would not have to be used or for any other reason. Such a subset might be randomly selected or might be selected to give preference to some property of the cases individually or as a whole subset. Such properties might include confidence of match, coverage of match, or distinction of cases from one another.

In the third column 222 of the display frame 216, a summary of the case, such as the case title, is illustrated. For example, the summary provided can have been previously entered by a customer support representative when answering customer calls. Even though the displayed summaries may contain mis-spellings, grammatical errors, and abbreviations, a user looking at each summary can quickly ascertain whether each respective case is associated with the category in question. Alternatively, multiple fields of each case can be displayed, with some of the fields optionally truncated to save space in the display frame 216. Also, some of the displayed information can be highlighted to attract the user's attention. In other implementations, the display frame 216 can display information in different forms, such as in one-, two-, or three-dimensional scatter plots (for numeric data), or a grid of thumbnail images (for image data), as examples.

Note that each of the case titles displayed in the third column 222 of the display frame 216 contains the word "charge." Based on the displayed case title, a user can select or de-select each user-selectable box in the second column 220. In other implementations, other types of summaries can be displayed in the third column 222 to provide information that the user can use to select or de-select boxes in the second column 220. Selection of a box indicates that the user has confirmed that the particular case belongs to the category. On the other hand, when a user de-selects a box in the second column 220, that is an indication that the corresponding case does not belong to the category in question (that is, the user has disconfirmed that the case belongs to the category). Additionally, a user can be given an option to select or de-select a case for a category or to leave the case as neither selected nor de-selected. Note that check boxes constitute one example implementation for confirming or disconfirming that a case belongs to a category. There are numerous other techniques in other implementations, including techniques to check plural boxes at the same time.

In a different embodiment, instead of displaying just one category, the display frame 216 can display multiple categories with fields that are user-selectable to confirm or disconfirm whether a case belongs to the categories. A confirmed case can be added to a positive training set, while a disconfirmed case can be added to a negative training set. The positive and negative training sets are used to train the categorizer.

As a user labels cases as belonging (or not belonging) to particular categories based on input to the confirmation module 122, training cases 112 (positive and/or negative training cases), are added. As the training cases 112 are added, the categorizer 116 is trained concurrently. The training of the categorizer 116 as positive training cases or negative training cases are added can be performed in the background (in some embodiments) so that the training (or retraining) of the categorizer 116 does not interfere with the search and confirm processes used for identifying training cases. The trained categorizer is installed atomically once the training is complete. If the user makes changes to the categories while the categorizer is training, the training can be stopped and restarted with the modified categories. Note that the term "training" refers to either the first training of a categorizer or a retraining of the categorizer.

Figure 3A:
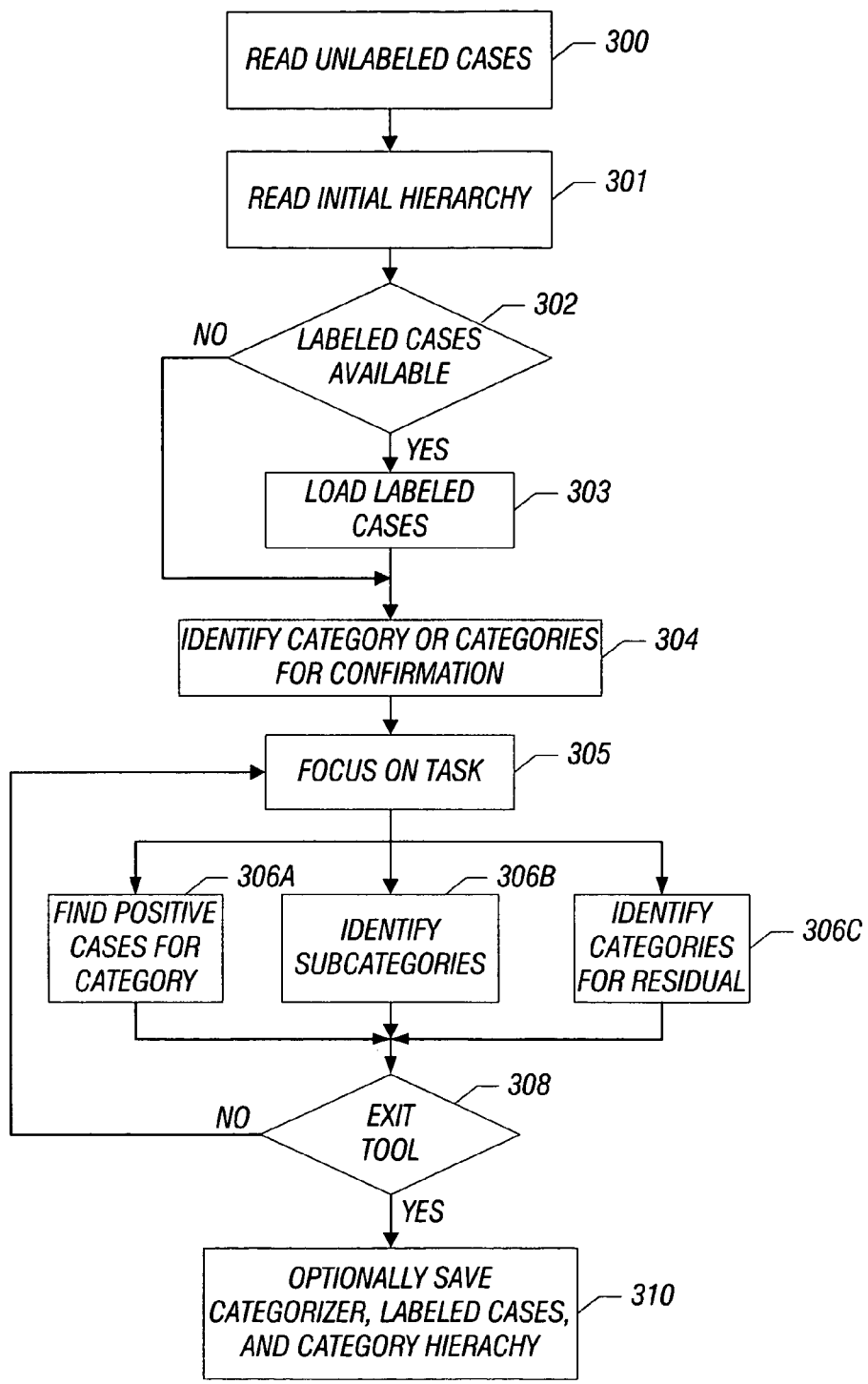
FIGS. 3A-3E are flow diagrams of processes performed by various modules in the system of FIG. 1, in accordance with an embodiment.

FIGS. 3A-3E show flow diagrams of processes performed by the modules executable in the computer 100 depicted in FIG. 1, in accordance with an embodiment. As shown in FIG. 3A, the computer 100 reads (at 300) unlabeled cases 110 (FIG. 1) in the storage 106 of the computer 100. The unlabeled cases 110 are associated with information of various types, such as textual, numeric, chronological, monetary, pictorial, aural, and so forth. According to one implementation, at least some of the fields (or columns) of the information associated with the cases can be presented in a way that several cases can be summarized simultaneously in the display frame 216 (FIG. 2) of the GUI screen 200. Also, the information allows a user to recognize from the displayed information whether or not a particular displayed case belongs to a particular category. Note that in addition to information that are displayable in the display frame 216 to assist a user in confirming or disconfirming a category, the cases 110 also contain information that is useful to the categorizer 116 for categorizing cases.

The computer 100 can also read an initial hierarchy of categories (at 301). One way of creating the initial hierarchy of categories is based on user input. In one scenario, training cases are to be developed for a new project, in which case a set of categories may not yet exist. In this scenario, a user can create one or a few categories as the starting point. An expert may create the categories based on a preconceived notion of the relevant categories (such as problems) associated with a particular project. Alternatively, the expert may create the one or few categories based on prior experience or common knowledge of the expert. For example, it may be well known that a product has problems with battery life, wireless connectivity, and keys following off. In a second approach, an expert may "eyeball" cases by scooping random samples and seeing which problems jump out at the expert. A user or the expert can add, delete, or modify categories using the category editor 126 (FIG. 1).

To assist in such discovery, the GUI screen 200 may be configured to display aggregate information extracted from the fields of all cases in the data set 104 or in a set of result cases. Such aggregate information might include a list of the most frequently encountered words, bigrams (two-word phrases), phrases, or sets of co-occurring words, sorted by and optionally displayed along with their relative frequencies.

Alternatively, instead of relying on a human user or expert, an automated module, such as the category inference module 128 or some other type of module, can be used to examine the unlabeled cases 110 and labeled cases 111 in the data set 104 and determine based on this examination one or plural possible categories. For example, one technique that can be used by the category inference module 128 is a cluster-detecting technique to identify groupings of cases. These groupings of cases identified by the category inference module 128 can be reviewed by a user or expert to determine which categories are appropriate to add to an initial set of categories. Note that this initial set of categories provided (at 301) does not have to be high-quality categories, nor do these categories have to survive the process of developing the categories. The initial set of categories merely provides a starting point.

In a different scenario, there may already be a set of extant categories that can be used as a starting point for further development of training cases.

The search-and-confirm manager 101 can also optionally determine (at 302) whether some labeled cases are already present. If some labeled cases are already present, as determined at 302, the labeled cases are loaded (at 303). Loading of the labeled cases causes the training module 114 to train the categorizer 116 using the labeled cases. The categorizer 116 can be invoked to determine how well the categorizer 116 categorized the cases in the existing training cases. The categorizer 116 based on these existing training cases can also be used to categorize the data set 104 of interest containing the unlabeled cases 110 to provide a first estimate of the number of cases in each category. Note that this initial categorization may not be accurate since it is unclear the extent of overlap between the existing training cases and the cases of the data set of interest.

After one or a few initial categories have been identified (at 304) for the purpose of searching and confirming, the user can cause the system to focus (at 305) on one of several user tasks. In FIG. 3A, the user task focused on can include one of the following: find positive training cases for a particular category (306A), identify subcategories of a particular category (306B), and identify categories or subcategories for the residual (306C), where the "residual" includes cases that the categorizer 116 cannot confidently assign to any category or to any subcategory of a given category. As an example, there may be cases that are identified to be in the "software" category, but that are not identified as being part of any particular subcategory of the "software" category. By focusing on these residual cases, the user can quickly identify new subcategories that can be added to the hierarchy of categories 124. The same notion of residual at a higher level (residual cases that are not identified to be in any category) can also be used to identify brand new categories. Note that during the execution of a given task the user may perform other actions, some of which may be appropriate to other tasks. For example, while finding positive training cases for a particular category, negative training cases for that category may also be identified, positive training cases for other categories may be identified, and modifications may be made to the category hierarchy.

As explained further below, as positive/negative training cases are added, and as new categories are added, the changes are propagated through the hierarchy 124 of categories and the categorizer is concurrently retrained.

The user task(s) can be performed for some amount of time, at which point the user can decide (at 308) to shift the focus to another task or to exit the tool. When the tool is exited, the modified (retrained) categorizer 116, the labeled cases 111, and the current version of the category hierarchy 124 may be saved (at 310). In some embodiments some or all of these elements are saved when or soon after they are modified. In some embodiments, the user is asked for confirmation before one or more of the elements is saved.

Figure 3B:
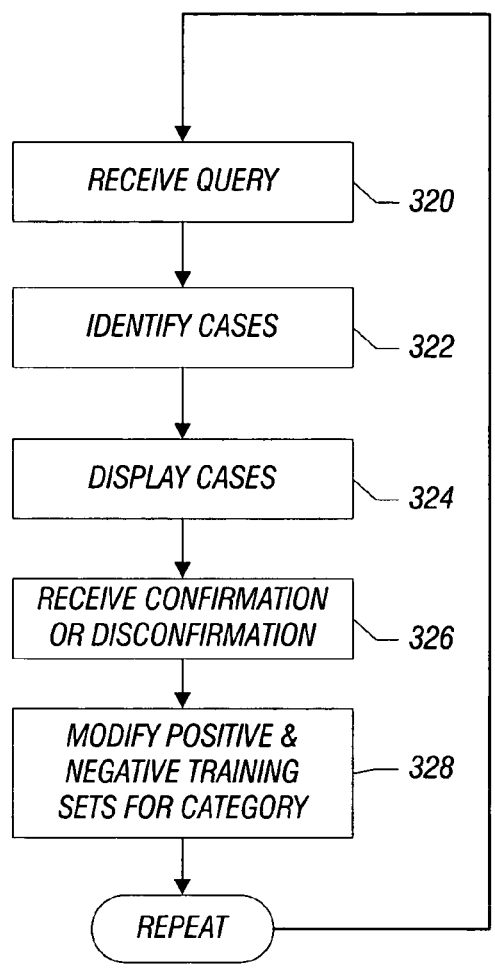

As shown in FIG. 3B, to start the scooping process, a user enters a query relating to a category into the search area 214 of the GUI screen 200 (FIG. 2), which is received (at 320). A query relates to a category if the query contains search term(s) for finding cases that belong to the category. Note that a query relating to one category can also relate to other categories as well; in other words, in some scenarios, a query can contain search terms to find cases belonging to multiple categories. The query can be in any of a number of formats, including a Boolean expression, a structured query language (SQL) query, or some other type of query. The search engine 102 can also have the capability of matching search terms specified by the query with related terms, such as synonyms. The related terms that are to be matched to the search term specified in the query can be grouped into a collection of terms. A case containing a term that matches any of the collection of terms is considered to be a match by the search engine 102.

The query can also specify search terms to allow a user to select cases identified by the user or by the categorizer as being positive or negative for a given category (or a child of the category), to select cases that the categorizer is not confident about for a given category, to select training cases which the current categorizer correctly or incorrectly labels with respect to a given category, to select cases which the categorizer cannot confidently associate with any category, and to select cases that match (or matched) earlier queries. Other types of search terms can be used, especially for other types of data, such as numbers or dates being within a given range, audio clips, images, video clips, and so forth.

In identifying matching cases, the search engine optionally performs at least one of the following: determining a membership status of the cases with respect to a set of cases associated with a category; determining whether or not the categorizer has labeled the cases with a category; and determining whether the categorizer has not labeled the case with any of the hierarchy of categories.

In the query, the user can also optionally specify the desired size of the result. For example, the user can specify that the search engine 102 identify all cases that match the query, in a deterministic or random order. If the order is to be deterministic, it may be sorted in any of several ways, e.g., in the order they appear in the data set, by one or more data values associated with each of the cases, or by the confidence the categorizer attaches to its assignment of the case to a particular category. In some embodiments the user can specify the sort order to use. Alternatively, the search engine 102 is instructed to identify a randomly drawn fixed number of cases that match the query, or to identify a randomly drawn number of cases based on the number of cases that can fit in the display frame 216 of the GUI screen 200. By randomly drawing cases that match the query and displaying such randomly drawn cases based on the number that will fit in the screen, the user can ensure that the displayed results are all visible, and that the displayed results are not biased towards the cases at the beginning of a data set. Randomly drawn cases may also be displayed in a deterministic or random order.

In the query, the user can also specify a baseline set, which contains a particular set of cases. The baseline set of cases can include those cases not explicitly labeled, those cases that are not confidently predicted, those cases that contain a certain word or any of its synonyms, or false positive cases for a particular category. The baseline set of cases may contain results from multiple queries. If a baseline set is specified, the results of the query can be preferentially selected from those cases in the baseline set.

More generally, the query allows a user to identify for display some desired grouping of the unlabeled cases that the user can then confirm or disconfirm as belonging to a particular category (or categories). In some cases, the query specified by the user is intended to identify cases that are likely to fall within a particular category. For example, to create training cases for the "batt" (or battery) category, a user can perform a search on the term "charge," since it is likely that cases falling in the "batt" category will have titles with the term "charge" in the titles. Other terms can also be specified to find additional cases for the "batt" category. The results for multiple queries can be combined into a baseline set for purposes of performing the confirmation process.

In response to the query, the search engine 102 identifies (at 322) the matching set of cases and displays (at 324) the identified set of cases in the user interface 118 (FIG. 1). As depicted in the example GUI screen 200 of FIG. 2, the displayed summary of the matching cases includes numbers, dates, and short strings, with a single line per case, in a table. Alternatively, the identified cases may be displayed in two-dimensional or three-dimensional graphs, or in other formats. Optionally, a user can also access information in addition to the displayed information, such as by clicking on a link. Additionally, the displayed information includes the category (or categories) that a user (or the categorizer) has associated with the case (either based on an earlier training set or based on a prediction by the categorizer).

As noted above, the submission of the query, identification of cases matching the query, and the display of the cases is part of the scooping process. Typically, the scooping process has been performed with a hypothesis in the form of "cases that match this query should be training examples for category C."

After the cases have been displayed by the search engine 102, then the confirmation module 122 can receive (at 326) user confirmation or disconfirmation. For example, some of the cases may have been identified or inferred as being or not being in the category (or categories) in question. In the example of FIG. 2, some of the user-selectable boxes in column 220 of the display frame 116 can have been checked based on this previous identification or inference.

In an embodiment, the categorizer can determine whether a matching case should be indicated as belonging to a category by computing a score indicating a confidence level. The score indicating a confidence level is compared to a predefined threshold, and if the score is greater than the predefined threshold, the categorizer identifies the matching case as belonging to the category.

The user next goes through the displayed cases and either confirms or disconfirms by respectively checking the box (or leaving the box checked) or un-checking the box (or leaving the box un-checked) in the column 220. Note that a case can belong to more than one category, so that a scoop for one category may return cases that have already been labeled as belonging to another category.

For those cases that have been indicated as belong to the category in question (based on user selection of the box in column 220 in FIG. 2), the confirmation module 122 modifies (at 328) the positive training set by adding such cases to the positive training set for the category. For those cases that have been incorrectly matched, which are cases that the categorizer 116 initially identified as belonging to the category but which the user has disconfirmed as belonging to the category, the confirmation module 122 modifies (at 328) the negative training set by adding such cases to the negative training set for the category. Optionally, when the user disconfirms a case as belonging to a first category, the user can confirm that the case belongs to another category (although the user does not have to). The positive training set of cases and negative training set of cases are part of the training cases 112 in FIG. 1. Note that there can be plural sets of positive cases and plural sets of negative cases for respective categories.

Steps 320-328 are repeated to develop training cases for other categories or to more fully develop training cases for a current category.

Figure 3C:
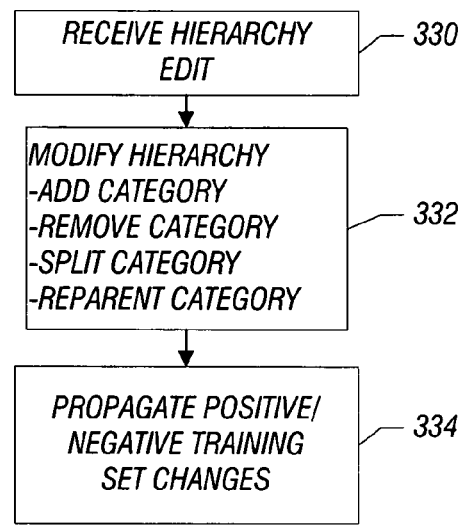

As part of the process of confirming or disconfirming cases, the user may realize that a new category should be created. In the example depicted in FIG. 2, the user can do this using one of the menu items of the GUI screen 200, such as the "File," "Edit," or "Tools" menu items, or some other control element in the GUI screen 200. As shown in FIG. 3C, the category editor 126 receives (at 330) an edit input (through the GUI screen 200) regarding a newly created category (or subcategory), a modified category (or subcategory), or a deleted category (or subcategory). In response to user input adding a new category (or subcategory), modifying a category (or subcategory), or deleting a category (or subcategory), the category editor 126 modifies (at 332) the hierarchy 124 of categories (FIG. 1). In the present discussion, it is noted that adding, deleting, or modifying a category refers to adding, deleting, or modifying a category and/or subcategory.

A user may notice that a category may be sufficiently large (may contain a relatively large number of cases) such that subcategories are warranted. In this case, a user can input a new subcategory for the identified category through the category editor 126. The user can monitor for the number of cases in each category using the information in frame 204 (FIG. 2), for example. The user can also split a category (into multiple categories) or reparent a category (indicate one category as being a parent of another category).

In one example, an expert may identify "software" as a category. However, the number of cases belonging to the software category may be large, so that subcategories are created, such an "e-mail" category, a "photo album" category, a "text editor" category, and so forth. These subcategories are entered by the user through the category editor 126, and training cases are then built for the subcategories using the scooping and confirming processes.

The modification of the hierarchy 124 of categories can result in changes of the positive and negative training sets, which changes are propagated (at 334) through the hierarchy 124 of categories.

Figure 3D:
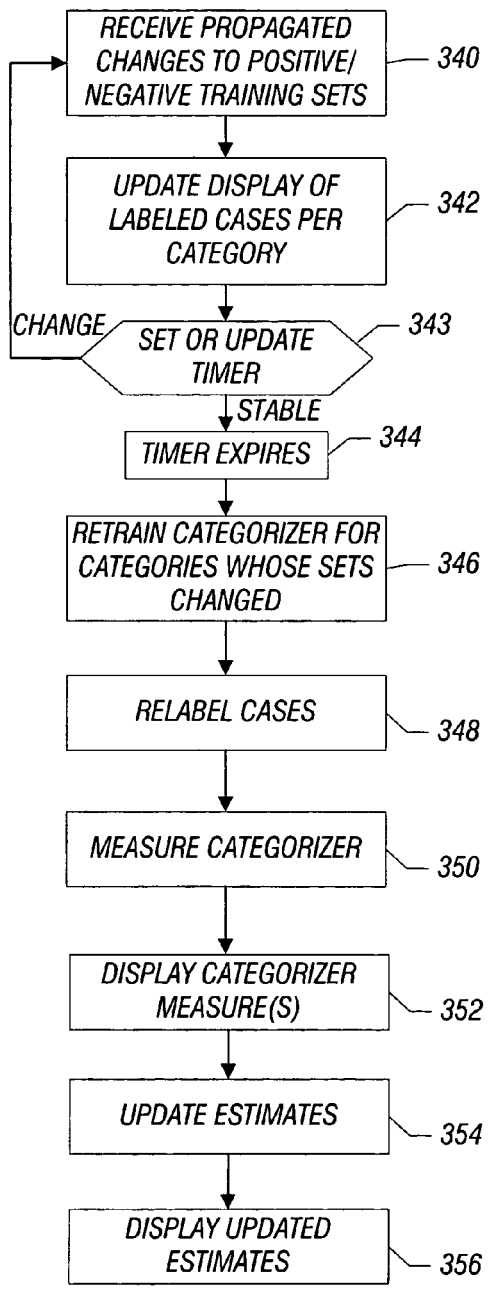

As discussed, as the user performs confirm/disconfirm and as categories or subcategories are added/modified/deleted, changes occur in the positive and negative training sets, which are propagated (at 340) through the hierarchy 124 of categories, as depicted in FIG. 3D. The display of the number of cases per category is updated (at 342).

As the training cases 112 are being updated by the scooping and confirming processes described above, the categorizer 116 is retrained (at 346) in the background for categories whose positive or training sets have changed. Optionally, the retraining (at 346) can be delayed, by use of a timer involving optional steps 343 and 344. The timer is set or updated (at 343) to expire after a predetermined amount of time. Any change to the training cases will cause the process to loop back to step 340 (which will cause the timer to again be set or updated at 343). After some period of stability (a period during which no changes occur) has been detected, the timer expires (at 344), which allows the categorizer retraining (at 346) to be performed. Checking for stability at 344 avoids the situation where many successive changes in the positive and training sets in a short period of time caused by user confirming/disconfirming or category modification causes the retraining to restart many times. The retraining of the categorizer 116 can occur generally concurrently with the scooping and confirming processes so that the user can continue to perform the scooping and confirming processes even while the categorizer is being trained, subject to the training module 114 (optionally) waiting for expiration of the timer to ensure some time period of stability. An output provided by the scooping process, confirming process, and training process described above is a categorizer, or plural categorizers.

The retrained categorizer is invoked to re-categorize or relabel (at 348) the cases 112. Also, the quality of categorization or labeling performed by the categorizer can be determined (at 350), and a measure of this quality can be displayed (at 352). The quality measures of a categorizer are listed above.

Also, output from the categorizer can be used to update (at 354) estimates regarding number of cases and quantity estimates (columns 208 and 210 in FIG. 2). The updated estimates are displayed (at 356) in the frame 204 of FIG. 2.

Steps 340-356 are repeated as positive and/or negative training sets are modified for the various categories.

Figure 3E:
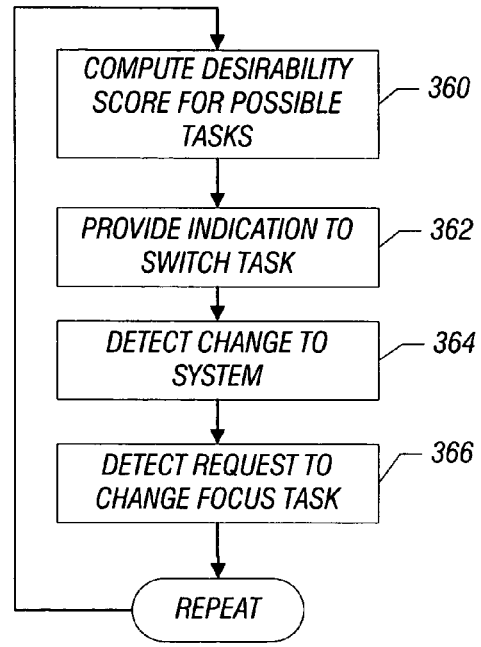

The scooping process, confirming process, and training of the categorizer can be repeated by the user for some period of time. At some point, a user may decide that the current category that is being focused on is sufficiently well trained and that the user should switch to another category. As shown in FIG. 3E, The focusing module 134 can monitor these processes in the background, and can compute (at 360) desirability scores for various tasks. If the focusing module 134 determines from the desirability scores that the user should switch tasks, then the focusing module 134 provides (at 362) an indication, such as a pop-up window with a message notifying the user that the user should switch to a different task (such as to focus on a different category). For example, the pop-up window can provide a selection field to enable the user to switch to a different category. The user can then submit a new query relating to another category, and then scooping, confirming, and categorizer training steps (320-328 and 340-356) are repeated for the other category.

The focusing module 134 can also enable switching to other tasks, such as finding example cases for a particular category, finding subcategories for a category, and identifying new categories by looking at cases that the categorizer 116 is unable to find categories for. The focusing module 134 is able to track tasks in the computer 100, and provide some indication that the user should switch to a different task.

The focusing module 134 then detects (at 364) any change to the system (such as hierarchy change, training sets change, and categorizer change). Any such change causes the focusing module 134 to loop back to 360 to recompute the desirability scores.

In response to user selection to change tasks, the focusing module 134 detects (at 366) the request to change focus task. Control then proceeds to 360 to recompute desirability scores.

As additional categories are added, positive training cases and negative training cases are identified for the additional categories, using the search and confirm processes described above. Also, categories can be modified and deleted. If two categories are related (such as in a parent-and-child relationship), then deletion of a first one of the categories will cause the positive and negative cases for the other one of the categories to be modified. As an example, if a child category is deleted, then the positive and negative cases for the child category will be added to the parent category.

The search-and-confirm technique according to some embodiments of building training information for training a categorizer enables a user to focus on one, or a few categories at a time for the purpose of identifying cases that belong, or do not belong, to the category or categories. By focusing on one or a few categories, the user or expert's task of classifying cases with categories is simplified with respect to conventional techniques in which the user or expert has to focus on many categories at a time with the goal of identifying as many categories as possible that apply to each case.

A further potential benefit of some embodiments is that categories can be added, deleted, or modified during development of the training information without losing prior work. Also, the search-and-confirm technique of creating training information does not have to rely on unreliable techniques of collecting information such as surveys or categorizations by customer support representatives handling customer calls.

Instructions of the various software modules described above are loaded for execution on corresponding processors. The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system, comprising:
    at least one processor;
    a data set comprising a plurality of cases;
    a search engine executable on the at least one processor to receive a query relating to at least one category and to identify cases within the data set that match the query, the identified cases being unlabeled with respect to the category, wherein the search engine is to identify the cases that match the query without using a categorizer that determines whether or not the cases belong to the category;
    a confirmation module executable on the at least one processor to:
        receive a first user indication in a user interface that a first case of the identified cases belongs to the category, and a second user indication in the user interface that a second case of the identified cases does not belong to the category,
        in response to receiving the first and second user indications in the user interface, modify training information for training the categorizer, the confirmation module modifying the training information by adding the first case to a positive training set of cases, and adding the second case to a negative training set of cases; and
    a training module executable on the at least one processor to modify the categorizer based on the positive and negative training sets.

2. The system of claim 1, further comprising a display monitor configured to display information associated with the identified cases, wherein the display monitor is configured to display selection boxes for the respective identified cases, and wherein the confirmation module is executable on the at least one processor to receive the first indication for the first case in response to user selection of a respective one of the selection boxes, and the confirmation module is executable on the at least one processor to receive the second indication for the second case in response to user deselection of a respective one of the selection boxes.

3. The system of claim 1, wherein the training module is executable on the at least one processor to modify the categorizer concurrently with execution of the search engine and the confirmation module.

4. The system of claim 3, wherein the training module is executable on the at least one processor to train the categorizer in a background during execution of the search engine and the confirmation module.

5. The system of claim 1, wherein the query specifies a term and the search engine is executable on the at least one processor to match the term with information associated with the identified cases.

6. The system of claim 5, wherein the term comprises one of a string expression, a regular expression, a glob expression, a substring expression, and an expression containing non-text data.

7. The system of claim 5, wherein the term is associated with a collection of terms, and wherein the search engine is executable on the at least one processor to further match the collection of terms with information associated with the identified cases.

8. The system of claim 7, wherein the term specified by the query comprises a word, and wherein the collection of terms comprises synonyms of the word.

9. The system of claim 1, wherein the search engine is executable on the at least one processor to receive a second query and to identify cases in response to the second query by performing at least one of the following: determining a membership status of the cases with respect to a set of cases associated with a second category; determining whether or not the categorizer has labeled the cases with the second category; and determining a value provided by the categorizer with respect to the cases and the second category.

10. The system of claim 1, wherein the categorizer is executable on the at least one processor to compute a confidence level with respect to a decision whether to label each of the identified cases as belonging to the category.

11. The system of claim 1, wherein the category is part of a hierarchy of categories, the system further comprising a category editor executable on the at least one processor to update the hierarchy of categories based on user inputs by adding at least one more category to the hierarchy.

12. The system of claim 11, wherein the search engine and confirmation module are executable on the at least one processor to enable identification of cases in the data set with respective categories.

13. The system of claim 11, wherein the category editor is executable on the at least one processor to enable creation of subcategories of at least one of the categories.

14. The system of claim 1, wherein the category is part of an initial hierarchy of categories, and wherein the initial hierarchy of categories provides a starting point, the system further comprising a category editor executable on the at least one processor to update the initial hierarchy of categories based on user inputs.

15. The system of claim 1, further comprising a hierarchy inference module executable on the at least one processor to examine the cases in the data set and to construct a hierarchy of categories in response to examining the cases.

16. The system of claim 1, wherein the search engine is executable on the at least one processor to receive another query not relating to the category and to identify at least one case within the data set that matches the other query, the system further comprising a display monitor to display information associated with the identified cases.

17. The system of claim 1, wherein the positive training set is a positive training set for the category, and the negative training set is a negative training set for the category.

18. The system of claim 1, wherein the search engine is executable on the at least one processor to receive the query from the user interface.

19. A method, comprising:
receiving, by a system having a processor, a query relating to at least a first category to search cases stored in a data set;
identifying, by the system, a first group of cases in the data set matching the query, the first group of cases being unlabeled with respect to the first category, wherein the first group of cases that are unlabeled with respect to the first category have not been labeled by a categorizer for determining whether or not cases belong to the first category;
receiving, by the system, a first user indication in a user interface that at least a first case in the first group belongs to the first category, and a second user indication in the user interface that at least a second case in the first group does not belong to the first category;
modifying, by the system, training information for training the categorizer in response to receiving the first and second user indications, wherein modifying the training information comprises adding the first case to a positive training set of cases and adding the second case to a negative training set of cases; and
modifying, by the system, the categorizer based on the positive and negative training sets.

20. The method of claim 19, further comprising adding the first group of cases to a baseline set.

21. The method of claim 19, further comprising:
receiving a second query relating to a second category to search the cases stored in the data set;
identifying a second group of cases in the data set matching the second query, the second group of cases unlabeled with respect to the second category;
receiving user indications in the user interface of which cases in the second group belong to the second category, the first and second categories being part of a hierarchy of categories; and
modifying the categorizer in response to receiving the user indications of which cases in the second group belong to the second category.

22. The method of claim 21, wherein the positive training set is a first positive training set, the method further comprising:
adding cases in the first group indicated as belonging to the first category to the first positive training set; and
adding cases in the second group indicated as belonging to the second category to a second positive training set of cases, wherein modifying the categorizer is based on the first and second positive training sets.

23. The method of claim 19, further comprising displaying indicators of which cases in the first group belong to the first category and indicators of which cases in the first group do not belong to the first category.

24. The method of claim 23, wherein displaying the indicators is based on at least one of (1) whether a user has labeled cases as belonging to the first category, and (2) whether a user has labeled cases as not belonging to the first category.

25. The method of claim 19, further comprising:
receiving an indication that a second category is to be added to a hierarchy of categories, the hierarchy further including the first category.

26. The method of claim 25, wherein receiving the indication that the second category is to be added comprises receiving an indication that the second category is to be added as a child of the first category.

27. The method of claim 19, further comprising:
receiving an indication that a second category is to be added to an initial hierarchy of categories, the initial hierarchy further including the first category, wherein the initial hierarchy of categories provides a starting point.

28. The method of claim 19, wherein the first category is part of a hierarchy of categories, the method further comprising:
receiving an indication to delete a second one of the categories from the hierarchy; and
deleting the second category from the hierarchy in response to receiving the indication to delete the second category.

29. The method of claim 19, wherein the first category is part of a hierarchy of categories that further includes a second category and a third category, wherein the second category is a child of the first category, the method further comprising:
receiving an indication that the second category should be a child of the third category instead of the first category.

30. The method of claim 19, wherein the first category is part of a set of categories, the method further comprising:
performing at least one of a plurality of tasks, the plurality of tasks including: identifying training cases for the first category; and identifying subcategories for the first category.

31. The method of claim 30, further comprising indicating a desirability of switching from one of the plurality of tasks to another of the plurality of tasks.

32. The method of claim 19, further comprising displaying information regarding a performance of the categorizer.

33. The method of claim 32, wherein displaying the information regarding the performance of the categorizer comprises displaying at least one of a false positive rate, a true positive rate, a true negative rate, an accuracy measure, a recall measure, a precision measure, a binormal separation measure, an information gain measure, a lift measure, a stability under cross-validation measure, a measure for an area under a receiver operating characteristic curve, a number of training cases, a percentage of a target training size, an f-measure, a total cost, and an average cost.

34. The method of claim 19, wherein receiving the first user indication comprises receiving first user selection of a first user-selectable item in the user interface, and wherein receiving the second user indication comprises receiving second user selection of a second user-selectable item in the user interface.

35. The method of claim 19, wherein the positive training set is a positive training set for the first category, and the negative training set is a negative training set for the first category.

36. The method of claim 19, wherein the query is received from the user interface.

37. An article comprising at least one non-transitory storage medium containing instructions that when executed cause a computer to:
   store a data set comprising a plurality of cases not labeled with respect to a category;
   receive a first query relating to at least the category;
   identify cases within the data set that match the first query, the identified cases unlabeled with respect to the category, wherein the identified cases that are unlabeled with respect to the category have not been labeled by a categorizer for determining whether or not the cases belong to the category;
   receive a first user indication in a user interface that a first case of the identified cases belongs to the category, and a second user indication in the user interface that a second case of the identified cases does not belong to the category;
   modify training information for training the categorizer in response to receiving the first user indication and the second user indication, wherein modifying the training information comprises adding the first case to a positive training set of cases and adding the second case to a negative training set of cases; and
   modifying the categorizer based on the positive and negative training sets.

38. The article of claim 37, wherein the instructions when executed cause the computer to further:
   receive a second query; and
   identify at least another case within the data set that matches the second query, wherein the identified at least another case has been processed by the categorizer.

39. The article of claim 37, wherein the instructions when executed cause the computer to:
   display the cases matching the first query, the first query specifying a limit of the number of cases to display.

40. The article of claim 39, wherein the limit is based on an amount of information that is viewable without any further action from a user.

41. The article of claim 37, wherein the instructions when executed cause the computer to display a data item associated with at least one of the identified cases in at least one of a table and a graph.

42. The article of claim 37, wherein receiving the first user indication comprises receiving first user selection of a first user-selectable item in the user interface, and wherein receiving the second user indication comprises receiving second user selection of a second user-selectable item in the user interface.

43. The article of claim 37, wherein the positive training set is a positive training set for the category, and the negative training set is a negative training set for the category.

44. The article of claim 37, wherein the first query is received based on user input in the user interface.

* * * * *